Nov. 17, 1959    W. B. SEIDEL ET AL    2,912,798
LOADER FOR MACHINE TOOL
Filed Nov. 14, 1958    9 Sheets-Sheet 1

Fig. 1.

INVENTORS
WILLIAM B. SEIDEL
BERTRAM H. STEINHARD
BY
ATTORNEYS

United States Patent Office 2,912,798
Patented Nov. 17, 1959

2,912,798

LOADER FOR MACHINE TOOL

William B. Seidel and Bertram H. Steinhard, Cincinnati, Ohio, assignors to The Cincinnati Milling Machine Co., Cincinnati, Ohio, a corporation of Ohio Application November 14, 1958, Serial No. 773,993

18 Claims. (Cl. 51—103)

The present invention relates to a loader mechanism, particularly suitable for loading workpieces for external centerless grinding operations of the type where the workpiece is supported on shoes.

In machine tools used for quantity production, and particularly relatively expensive machines, it is important that the rate of production of the machines be as high as possible. Time spent in loading and unloading the machine, time in which a workpiece is not being operated on, constitutes lost production and it is important to reduce this unproductive time to a minimum.

In the present invention an unusually rapid work handling mechanism is disclosed with which a workpiece can be loaded at the same time that the previous operated workpiece is unloaded. The workpieces are, at all times during loading and unloading, under the positive control of the mechanism and the speed of movement of the workpieces is not limited by gravity. The mechanism moves the workpieces in a regular, direct path and the mechanism can be powered at high speeds without losing control of the workpieces or causing wrecks.

It is therefore an object of the present invention to provide a work handling mechanism in which workpieces, or other parts, are loaded and unloaded simultaneously.

It is another object of the present invention to provide a work handling mechanism which maintains positive control over the workpiece during the loading and unloading thereof.

It is yet another object of the present invention to provide a loader mechanism in which the parts moved thereby are decelerated for a gentle delivery.

It is still another object of the present invention to provide a loader mechanism which is of simple construction, which moves the parts to be loaded in a direct path, and which is positive acting and effective in its operation.

In brief, in the preferred embodiment of the invention, a loading chute and a discharge chute are mounted opposite the grinding wheel, the loading chute above the discharge chute. Both chutes lie in a common plane with the shoes located adjacent the grinding wheel which support the workpiece during the grinding operation. A loader arm is mounted to swing between a pickup position adjacent the loading chute to a delivery position adjacent the workpiece supporting shoes and an unloader arm is mounted to swing between a pickup position adjacent the shoes to a delivery position adjacent the discharge chute. Both arms are shiftable towards and away from the plane of the chutes and shoes and each has a finger at its outer end which fits loosely within a workpiece. The arms shift in unison toward the workpieces at their pickup position to engage a workpiece and swing in unison to their delivery positions, thus loading and unloading a workpiece simultaneously. At their delivery positions a magnetic driver at the shoes and a demagnetizer at the discharge chute hold the workpieces while the arms shift out of engagement therewith. The arms return empty to their pickup positions while the workpiece is being ground. At their pickup positions the arms again shift to engage workpieces and as soon as the grinding wheel retracts, swing to their delivery positions.

Motion for swinging the arms is transmitted from a hydraulic cylinder, which operates at a relatively constant velocity, through mechanism including a scotch yoke comprising a swinging arm and a cross slide, so that the loading and unloading arms accelerate as they move from their pickup positions, and decelerate as they approach their delivery positions for a gentle delivery.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 1:
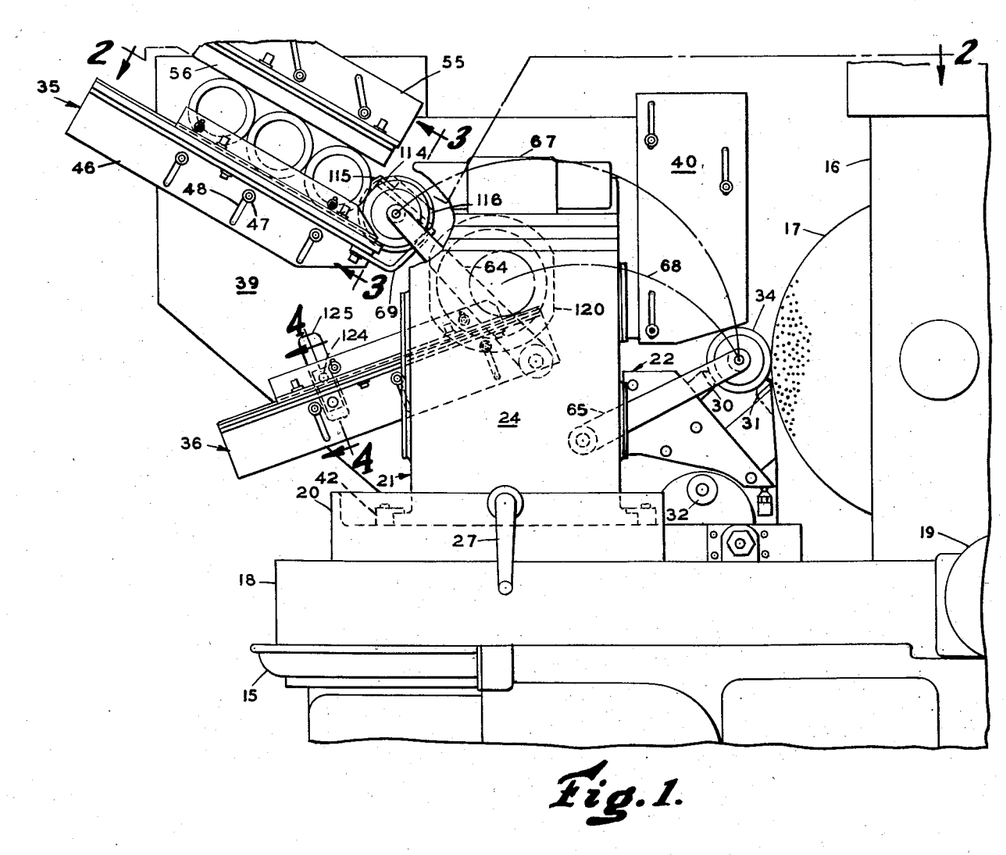
Fig. 1 is an elevational view of the work handling mechanism of the present invention.
Figure 2:
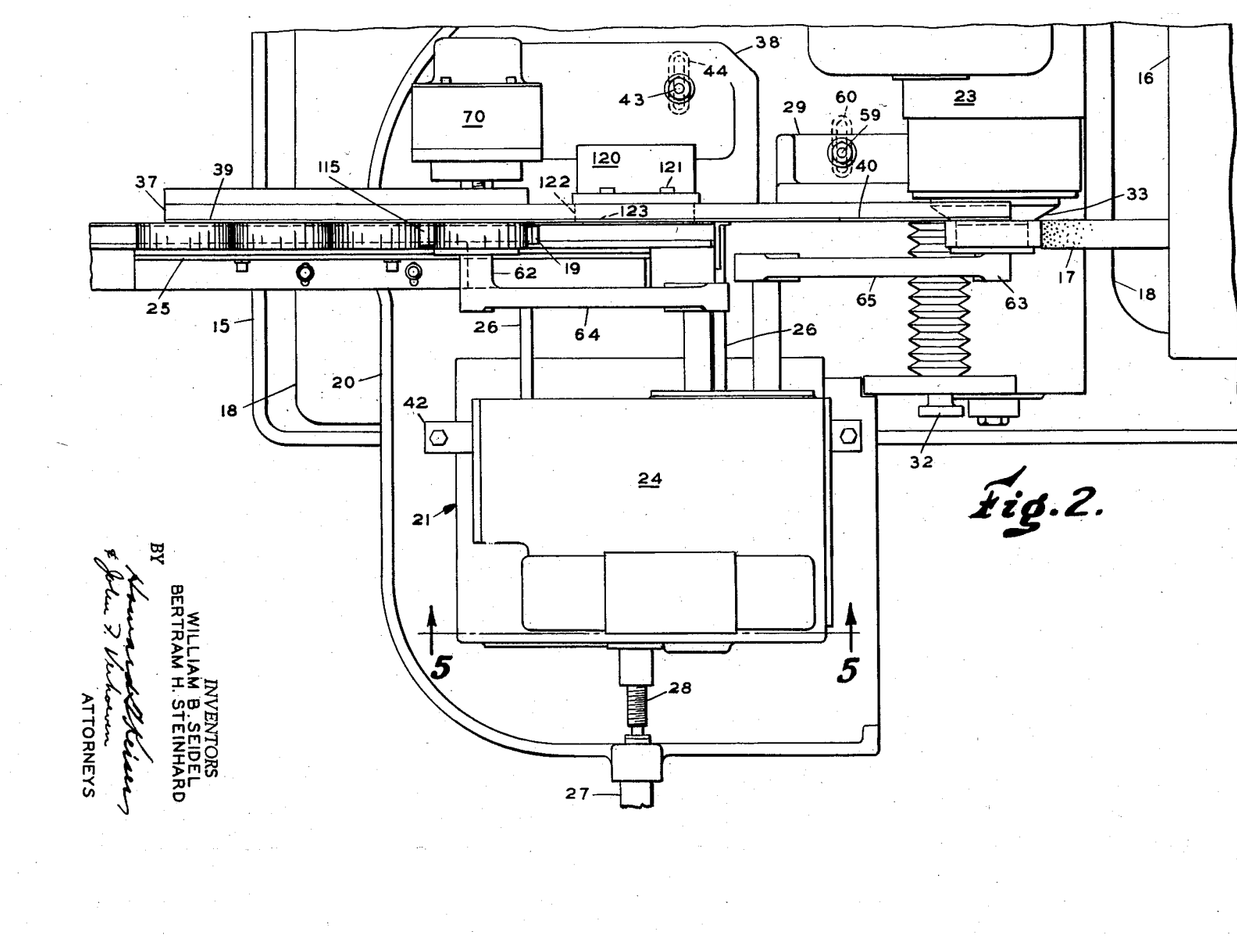
Fig. 2 is a view taken on line 2—2 of Fig. 1 showing the work handling mechanism in plan view.

As shown in Figs. 1 and 2 the machine has a base 15 on which is mounted a wheelhead 16 carrying the rotatable grinding wheel 17. A slide 18 is carried on the base 15 and is movable longitudinally in relation to the grinding wheel by handwheel 19. The slide 18 has swivel plate 20 pivotally mounted thereon. The swivel plate 20 carries a loading fixture shown generally at 21, a workpiece support shown generally at 22, and a headstock 23. The loading fixture has a housing portion 24 which is secured to the swivel plate by dovetail clamps 42 and a chute portion 25 which is supported by bracket 38 secured to the swivel plate by bolts 43 received in T slots 44. The housing portion 24 and chute portion 25 are connected by tie-bars 26 and when unclamped may be moved in relation to the swivel plate for alignment with the grinding wheel by crank 27 and screw 28. The workpiece support 22, which is mounted to swivel plate 20 by bracket 29, has a pair of adjustable shoes 30 and 31. Bracket 29 is secured to the swivel plate by bolts 59 received in T slots 60 and may be moved transversely in relation to the swivel plate when unclamped by means of a screw terminating in a knob 32. The headstock 23, which is also transversely movable in relation to the swivel plate, terminates in a rotatable magnetic driver 33 adjacent the workpiece support. The magnetic driver, when energized, holds a workpiece 34 on the shoes 30 and 31 during the grinding operation. The workpiece may, for example, be an annular bearing race as shown. The swivel plate 20 may be set so that a workpiece presented to the grinding wheel lies in the same plane as the grinding wheel, as shown in Figs. 1 and 2, or it may be set so that the workpiece is presented at an angle to the grinding wheel for producing a tapered conformation on the workpiece.

The wheelhead structure may be similar to the structure shown in U.S. Patent 2,795,088 of Schonhoft and Bernhard, issued June 11, 1957. As shown therein, the wheelhead is pivotally mounted to the base so that the grinding wheel may be swung into and out of engagement with a workpiece on the workpiece support.

A delivery chute 35 for holding unoperated workpieces and a discharge chute 36 for receiving operated workpieces are mounted in a common plane with the workpiece supporting shoes 30 and 31, as shown in Fig. 1, the delivery chute 35 being above the discharge chute 36. A vertical plate 37 connected to the upstanding leg of bracket 38, as shown in Fig. 2, extends parallel to this common plane and has two wear plates 39 and 40 connected to its front face.

Figure 3:
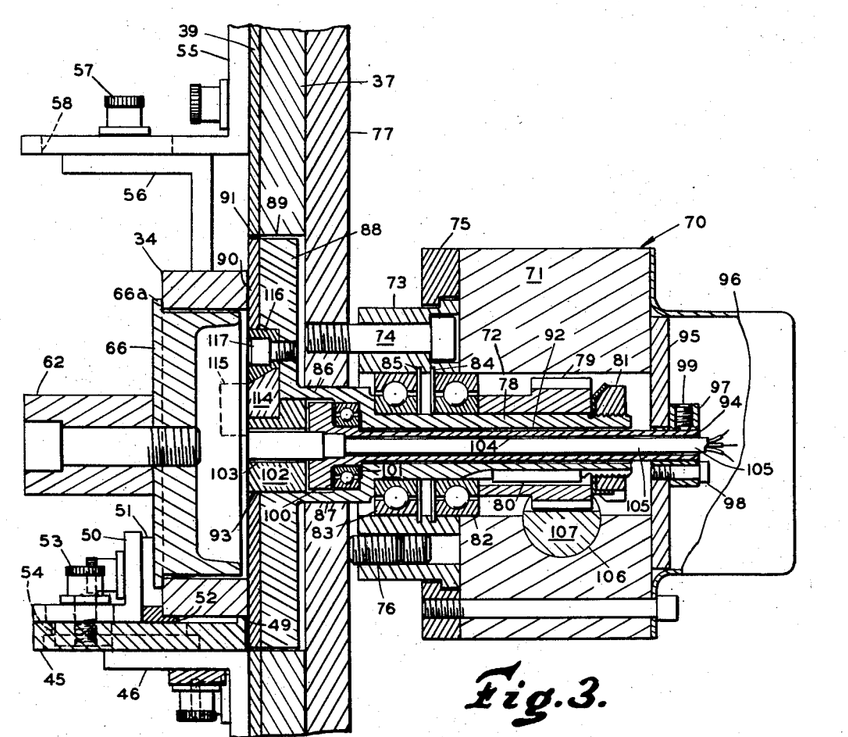
Fig. 3 is a view taken on line 3—3 of Fig. 1 showing the escapement mechanism in cross section and the delivery chute.

The chute, or storage means, 35, which slopes downwardly in the direction of the grinding wheel, consists of a lower portion and an upper portion. The lower portion, as shown in Fig. 3, has a plate 45 extending outwardly from the front face of wear plate 39 and supported by angle 46, which is connected to plate 37 by bolts 47 extending through slots 48 in the vertical leg of angle 46 and through the wear plate. The plate 45 has a ridge 49 adjacent the wear plate to support the inner edge of the workpiece. On the upper surface of plate 45 is mounted an angle 50 supporting a guide bar 51 with an inwardly extending toe 52 which supports the outer edge of the workpiece. The angle 50 is connected to plate 45 by bolts 53 extendig through a slot 54 in the plate whereby the guide bar 51 is laterally adjustable in relation to the wear plate so that workpieces of various widths may be accommodated. The upper portion of chute 35 consists of an angle 55 connected to plate 37 in a manner similar to angle 46. An angle 56 is connected to the lower face of the extending leg of angle 55, the depending leg of angle 56 constituting a guide to prevent the workpieces 34 from buckling or jumping out of the chute. The angle 56 which is connected to the angle 55 by bolt 57 extending through slot 58 is laterally adjustable to accommodate workpieces of varying width. The lower portion of the chute 35 as to the details described above, and the corresponding structure of the discharge chute 36 shown in Fig. 4, which slopes downwardly away from the grinding wheel, may be similar.

The loading fixture has two arms 64 and 65, each pivoted at one end and each having a finger 66 adapted to be loosely received inside the annular workpiece 34 to define a carrier therefor. The arms swing in unison, the loading arm 64 swinging its finger 66 and an unoperated workpiece thereon in a path 67 from a pickup position adjacent the lower end of chute 35 to a delivery position adjacent the shoes of the workpiece support 22, and the unloading arm 65 swinging its finger 66 and an operated workpiece thereon in a path 68 from a pickup position adjacent the shoes of the workpiece support 22, to a delivery position adjacent the upper end of discharge chute 36. As will be more fully described hereafter, the arms 64 and 65 shift laterally simultaneously in a direction normal to the plane of the chutes and workpiece support, moving toward the plane of the chute to engage workpieces at their pickup positions and moving away from the plane of the chutes to disengage workpieces at their delivery positions. The finger on arm 64 is mounted on a hub 62 located at the end of the arm, which hub is longer than a corresponding hub 63 on arm 65. The arm 65 is pivotally mounted closer to the plane of the chutes and shoes than arm 64, and is mounted lower and closer to the shoes 30 and 31 than arm 64. The workpieces are carried by both arms simultaneously from the pickup to delivery positions, the arms moving in different planes but, because of the relative length of the hubs, both the unoperated workpiece on arm 64 and the operated workpiece on arm 65 move in the planes of the chutes 35 and 36 and the workpiece supporting shoes 30 and 31. At the delivery positions both arms move away from that plane a like amount for disengagement from the workpieces and return empty to the pickup positions in the planes to which they were respectively shifted. With this arrangement the arms can swing simultaneously without interference therebetween and without interference between workpieces carried thereby. Each finger 66 has a shoulder 66a (see Fig. 3) which holds a workpiece on the finger between the shoulder and the wear plates.

The chute 35 has at its lower end a stop 69 which is connected to the lower face of angle 46 and extends upwardly around the end of the chute to hold the workpieces on the chute. An escapement mechanism shown generally at 70 is located behind the plate 37 adjacent the lower end of chute 35 as shown in Fig. 3. The escapement mechanism has a housing 71, and an annular member 73 in which the heads of angularly spaced bolts 74 are received is clamped to the front of the housing by ring 75. The housing and annular member 73 have a central bore 72 extending therethrough. Set screws 76 are threadedly engaged in member 73 and are also angularly spaced. The bolts 74 are threadedly received in plate 77, secured to the back of plate 37, and the set screws 76 engage plate 77 so that the escapement housing is securely but adjustably held in position. A sleeve 78 having pinion 79 keyed thereto as at 80 and held on the sleeve by nut 81 is rotatably carried in the bore 72 by spaced antifriction bearings 82 and 83. Bearing 82 is firmly held against pinion 79 by ring 84, and bearing 83 is securely held by ring 85 against a shoulder formed by an enlarged portion 86 of the sleeve. The portion 86 extends forwardly of the annular member 73 and is rotatably received in opening 87 in plate 77. At its forward end the sleeve terminates in a circular flange 88 received in circular opening 89 in plate 37 and having a sheet 90 of non-magnetic material secured to the forward face thereof. Sheet 90 extends through a circular opening 91 in wear plate 39 and is made flush therewith by adjustment of set screws 76.

The inner bore 92 of sleeve 78 has an enlarged portion corresponding to the enlarged portion of the sleeve which extends through flange 88 and aligns with opening 93 in sheet 90. A second sleeve 94 is loosely received in the bore 92 and extends rearwardly through the bore, through plate 95 secured to the rear face of the housing 71, and into a casing 96 secured to the back of the housing. A collar 97 secured to plate 95 by screw 98 and clamped to sleeve 94 by set screw 99 secures the sleeve against axial and rotational movement. The sleeve 94 has a collar 100 in the enlarged portion of bore 92, and an antifriction bearing 101 sandwiched between the collar 100 and the rear of the enlarged portion of the bore 92 supports the sleeve 94 in sleeve 78. An annular member 102 having a central bore 103 is snugly received in the forward end of bore 92 and extends into opening 93 flush with the forward face of sheet 90, the bore 103 being coaxial with a central bore 104 extending through the inner sleeve. An electric probe 105 is snugly received in bore 104 with its forward end extending through bore 103 and its front face flush with the front face of member 102 and its rear end extending into casing 96.

Figure 7:
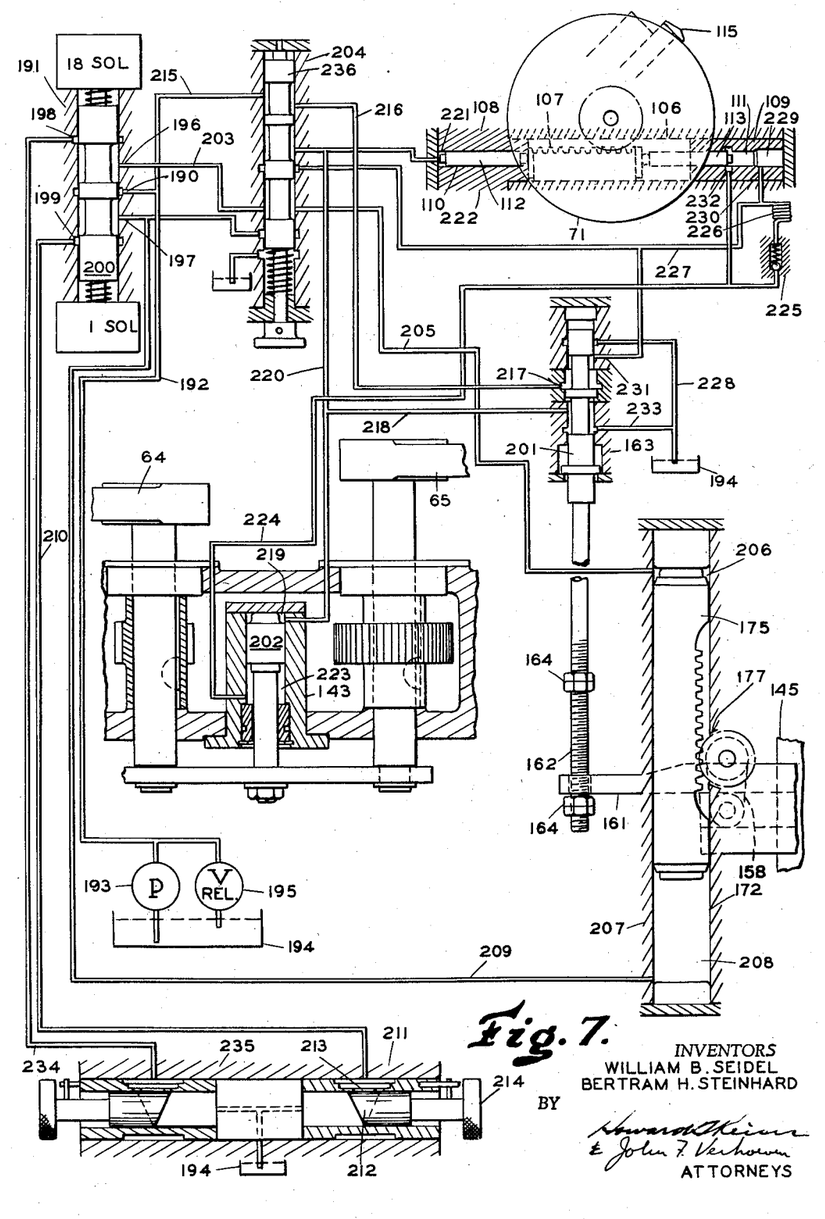
Fig. 7 is a schematic diagram of the hydraulic circuit for the work handling mechanism.

The housing 71 has a hole 106 drilled therethrough tangential to and in communication with bore 72, the hole 106 slidably receiving a rack member 107 engaged with pinion 79. As shown in Fig. 7, the housing has plugs 108 and 109 snugly received in the ends of the hole 106. Plugs 108 and 109 have bores 110 and 111 in which plungers 112 and 113 are slidably received.

As shown in Figs. 1 and 3, embedded in the flange 88 is a bar 114 having a detent 115 protruding forwardly therefrom into the chute. The bar 114 is secured in the flange by clamp block 116 and screw 117 so that the rotating detent clears the margin of a workpiece properly seated against stop 69 in the lower portion of the chute and in registration with the finger 66 of arm 64 when the arm is in the pickup position. When the detent 115 is rotated to a position behind the first workpiece in the chute, as shown in Fig. 1, the detent holds the second workpiece in the chute and the first workpiece can be swung by the arm 64 from between the stop 69 and the detent 115. When the flange 88 rotates the detent 115 clockwise from the position shown in Fig. 1, in response to movement of the rack member 107, the second workpiece will roll down against the stop 69. It should be noted that if a workpiece fails to seat properly against the stop 69, the detent 115 will cam the workpiece into proper position when it is rotated counterclockwise in response to reverse movement of the rack member 107 so that the workpiece will be in proper registration for pickup by the arm 64.

Figure 4:
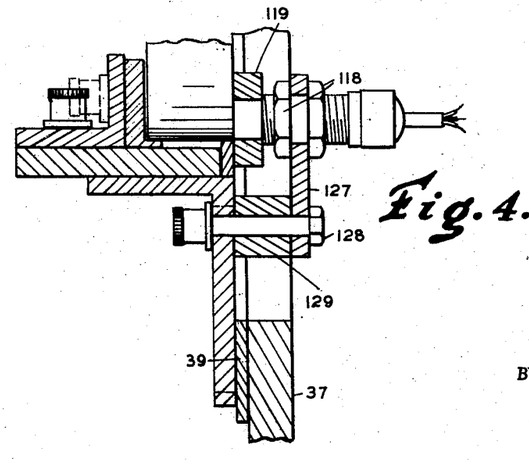
Fig. 4 is a view taken on line 4—4 of Fig. 1 showing the discharge chute in cross section and the probe unit.

A demagnetizer 120 is secured by bolts 121 to the back of plate 37 adjacent the position on discharge chute 36 where a workpiece is deposited by the unloading arm 65, as shown in Figs. 1 and 2. The demagnetizer extends through opening 122 in plate 37 and has on the front face thereof a sheet of non-magnetic material 123 flush with the wear plate 39. Near the lower end of discharge chute 36 an electric probe 124 is mounted in a slot 125 cut in plate 37 and wear plate 39, as shown in Figs. 1 and 4. Bracket 127 is secured to the supporting angle of chute 36 by bolt 128 being spaced therefrom by spacer 129. The probe extends through bracket 127 and is secured thereto by nuts 118. A block 119 of non-magnetic material is snugly received on the forward portion of the probe and is flush with the front face thereof and with the wear plate 39.

Figure 5:
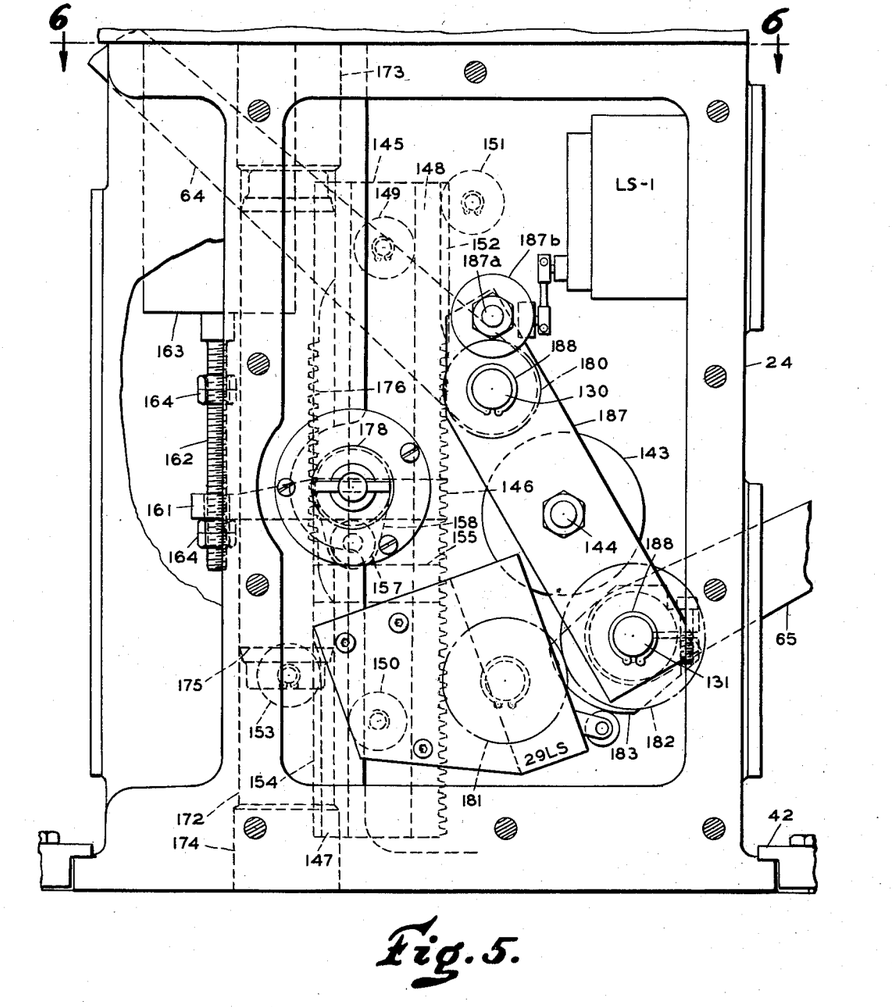
Fig. 5 is a view taken on line 5—5 of Fig. 2 showing the mechanism inside the housing in elevation.
Figure 6:
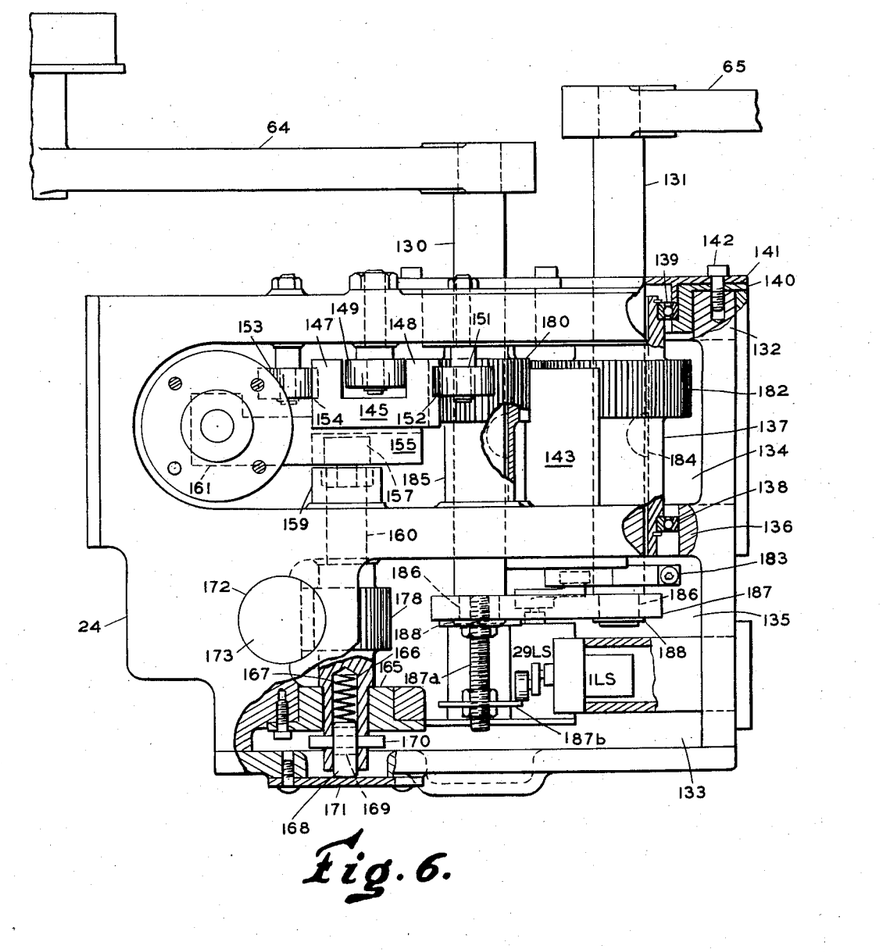
Fig. 6 is a view taken on line 6—6 of Fig. 5 showing a plan view of the mechanism inside the housing.

As shown in Figs. 5 and 6 the arms 64 and 65 are snugly received on shafts 130 and 131 respectively extending from housing 24. The housing 24 defines a fixed support for the shafts and they extend normal to the common plane of the chutes 35 and 36 and the shoes 30 and 31. The housing 24 has a rear wall 132, a front wall 133, and is divided into rear and front compartments 134 and 135 respectively by intermediate wall 136. A sleeve 137 is rotatably carried by antifriction bearings 138 and 139 secured respectively in the walls 136 and 132. The bearing 139 is received in fitting 140 and held therein by cap 141, the cap and fitting being secured to wall 132 by bolt 142.

Shaft 131 is slidably received in sleeve 137 and splined thereto at 184. A sleeve 185 is rotatably carried in the walls 132 and 136 in a manner similar to sleeve 137 and shaft 130 is slidably received therein and splined thereto in a similar manner. The shafts 130 and 131 each have a reduced portion 186 at their forward ends which extend into forward compartment 135. A bar 187 is received on the portions 186 and is clamped thereto by locking rings 188 to connect the shafts for axial shifting in unison. This axial shifting is achieved by hydraulic motor 143, the piston rod 144 of which is received in the bar and fastened thereto. The bar 187 has a rod 187a extending forwardly therefrom which carries a plate 187b for engagement with limit switch 1LS and operation thereof when the arms are shifted toward the plane of the chutes and workpiece support into the position shown in Fig. 6.

A vertical rack member 145 located in the rear compartment 134 has a pair of rearwardly extending arms 147 and 148. Rollers 149 and 150, carried by wall 132, extend between the arms, the upper roller 149 bearing on the inner surface of arm 148 and the lower roller 150 bearing on the inner surface of arm 147. Roller 151 engages a trough 152 on the outer surface of arm 148 and roller 153 engages a trough 154 on the outer surface of arm 147. The member 145 has a rack portion 146 on the outer surface of arm 148 below the trough 152 and a channel shaped cross slide 155 connected to and extending across its front face. A roller 157 is carried on the end of arm 158 which terminates in a hub 159 nonrotatably received on a shaft 160, the shaft, hub, arm and roller defining a crank. The roller is received in the cross slide 155 and as the shaft 160 is rotated, the roller is swung through an arc to move the rack member 145, guided by the rollers 149, 150, 151, and 153 engaged therewith, in a vertical path. An arm 161 which may be integral with the upper portion of cross slide 155 extends outwardly therefrom and a hole in the end of the arm loosely receives the actuating rod 162 of valve 163. The rod has spaced nuts 164 thereon which are engaged by the arm 161 at the extreme positions of the vertical motion of member 145 for operation of the valve. The shaft 160 is rotatably carried by wall 136 and a bushing 165 in wall 133. The shaft has a bore 166 in its forward end in which is received a spring 167 and a pin 168, the pin having a slot 169. A cross pin 170 through the shaft and slot 169 holds the pin 168 in the bore but permits axial movement thereof. When the cover plate 171 is removed for manual rotation of shaft 160 by a crank, the crank is normally held disengaged from shaft 160 by pin 168 when not urged into engagement by the operator.

A vertical bore 172 in the housing 24 is adjacent the forward compartment and is sealed by plugs 173 and 174 at the upper and lower ends thereof. The bore slidably receives a rack piston 175, the rack 176 of which engages a pinion 178 through slot 177 (see Fig. 7), the pinion being non-rotatably secured on the shaft 160. In this manner, the member 145 is moved in response to the movement of piston 175, elevation of the piston lowering member 145 and lowering of the piston raising member 145. The limits of movement of piston 175, and hence member 145 and the arms 64 and 65, are established by contact with plugs 173 and 174.

The simultaneous swinging of the arms is achieved through the vertical movement of the member 145. The rack portion 146 thereof is engaged with a pinion 180 which is integral with the sleeve 185 in which the shaft 130 for arm 64 is received. The rack portion 146 is also engaged with idler pinion 181 rotatably carried by the rear wall 132, which pinion is engaged with pinion 182. Pinion 182 is integral with the sleeve 137 which receives shaft 131 for arm 65. Therefore, as member 145 is lowered, arm 64 is swung counterclockwise while arm 65 is swung clockwise as viewed in Fig. 5, thereby swinging both arms simultaneously to their pickup positions. The shafts 130 and 131 are of different lengths so that the arms swing in separate parallel planes without interference. As the member 145 is raised, the arms move, oppositely to the direction they move when the member is lowered, thereby swinging simultaneously toward their delivery positions. The sleeve 137 has clamped thereto a cam member 183 which operates limit switch 29LS as the arms approach their delivery position.

The hydraulic circuit for the loading mechanism is shown in Fig. 7. Pressure port 190 of reversing valve 191 is connected by pressure conduit 192 to a pump 193 supplying fluid under pressure from reservoir 194. The pressure in conduit 192 is established by relief valve 195 connected thereto. The valve 191 has a pair of motor ports 196 and 197 and a pair of exhaust ports 198 and 199. The valve has a spring centered slidable plunger 200 which is shifted down as viewed in Fig. 7 on energization of solenoid 18SOL connected at one end of the valve and is shifted up on energization of solenoid 1SOL connected to the opposite end of the valve.

When the arms 64 and 65 are in their pickup position and engaged with a workpiece, the piston 175 will be raised, the rack member 145 and arm 161 connected thereto will be down, the valve member 201 of valve 163 will be down, the piston 202 of hydraulic motor 143 will be as shown in Fig. 7, and the escapement detent 115 will be behind the first workpiece and in engagement with the second workpiece on the delivery chute 35. When limit switch 1LS is operated (see Fig. 6) by movement of the arms into position to engage an unoperated workpiece in chute 35 and an operated workpiece on shoes 30 and 31, respectively, solenoid 18SOL is energized (assuming the grinding wheel is retracted), and pressure port 190 is connected to port 196 through valve 191. Therefore, pressure is applied to conduit 203 through bypass valve 204 and conduit 205, to the upper chamber 206 of hydraulic motor 207 defined by the bore 172 and the piston 175. Exhaust from the lower chamber 208 is through conduit 209, port 197, valve 191, port 199, conduit 210, throttle valve 211 to reservoir 194. The valve 211 has a rotatable valve member 212 beveled at one end to open port 213 in an amount determined by the angular setting of knob 214 connected to the valve member 212. As piston 175 is lowered, in response to pressure in chamber 206, arms 64 and 65 with workpieces thereon, swing to their delivery positions, and arm 161 is simultaneously raised. When the piston 175 is fully down and the workpieces delivered, valve member 201 is operated and raised from the position shown in Fig. 7.

The pressure port 190 of valve 191 is also connected by way of conduit 215, bypass valve 204, and conduit 216 to pressure port 217 of valve 163. When valve member 201 is raised, pressure is supplied through valve 163 and conduit 218 to chamber 219 of hydraulic motor 143 to shift the arms away from the plane of the chutes and the workpiece support and disengage the fingers on the arms from the delivered workpieces. At the same time, pressure is supplied through conduit 220 which is connected to conduit 218, to chamber 221 of hydraulic motor 222 defined by the bore 106, rack member 107, and the associated hydraulic mechanism of the escapement. This moves plunger 112 to the right as viewed in Fig. 7 to operate the escapement and swing the detent 115 clockwise as viewed in Fig. 1 to release a workpiece which drops to the lower position on chute 35. Chamber 223 of motor 143 is connected to exhaust by conduit 224, check valve 225, resistance 226, conduit 227, valve 163, and conduit 228. Chamber 229 of motor 222 is connected to exhaust through port 230, conduit 227, valve 163, and conduit 228.

As the arms shift out of engagement with the workpieces, limit switch 1LS is released (see Fig. 6), and solenoid 1SOL is energized. This shifts valve member 200 of valve 191 upwardly as viewed in Fig. 7 to connect pressure port 190 to port 197, and through conduit 209 to chamber 208 of hydraulic motor 207. This raises piston 175 and lowers member 145 to swing the arms, empty, to the pickup position. When piston 175 reaches the top member 145, and arm 161 connected thereto is down, valve 163 is shifted to the position shown in Fig. 7. Chamber 206 of motor 207 is connected to exhaust through conduit 205, valve 204, conduit 203, valve 191, port 198, conduit 234, and through valve 235 which may be similar to the throttle valve 211. When valve member 163 is lowered, pressure port 217, which is always connected to pressure through conduit 192, conduit 215, valve 204, and conduit 216, is connected to port 231, and pressure is supplied through conduit 227, port 230, to chamber 229 of hydraulic motor 222. This moves plunger 113 to the left as shown in Fig. 7 to operate the escapement and swing the escapement detent 115 counterclockwise as viewed in Fig. 1 to a position between the first and second workpieces on the delivery chute. Port 232 of motor 222 is spaced from port 230, and when the plunger 113 has moved far enough to operate the escapement the two ports are connected through the bore 111, and pressure is supplied to conduit 224 and chamber 223 of motor 143. This shifts the arms toward the plane of the chutes and work supporting means and into engagement with the workpieces, the finger 66 of arm 64 engaging the first unoperated workpiece on chute 35 and the finger 66 of arm 65 engaging the operated workpiece on shoes 30 and 31. Chamber 219 of motor 143 is connected to exhaust by conduit 218, valve 163, and conduit 233 while chamber 221 of motor 222 is connected to exhaust through conduit 220, conduit 218, valve 163, and conduit 233.

During normal automatic operation of the loading mechanism, plunger 236 of by-pass valve 204 remains in the position shown in Fig. 7, connecting conduit 215 to conduit 216 and conduit 203 to conduit 205. The plunger 236 may, however, be manually shifted downwardly from the position shown in Fig. 7 so that pressure supplied through conduit 215 is blocked and pressure conduit 216 to valve 163 is isolated. The shifting of plunger 236 connects conduit 220 and conduit 227 so that chambers 221 and 229 of motor 222 are connected for manual manipulation of the escapement mechanism. When plunger 236 is so shifted conduit 209 is connected to conduit 205 to permit manual rotation of the arms 64 and 65.

Figure 8:
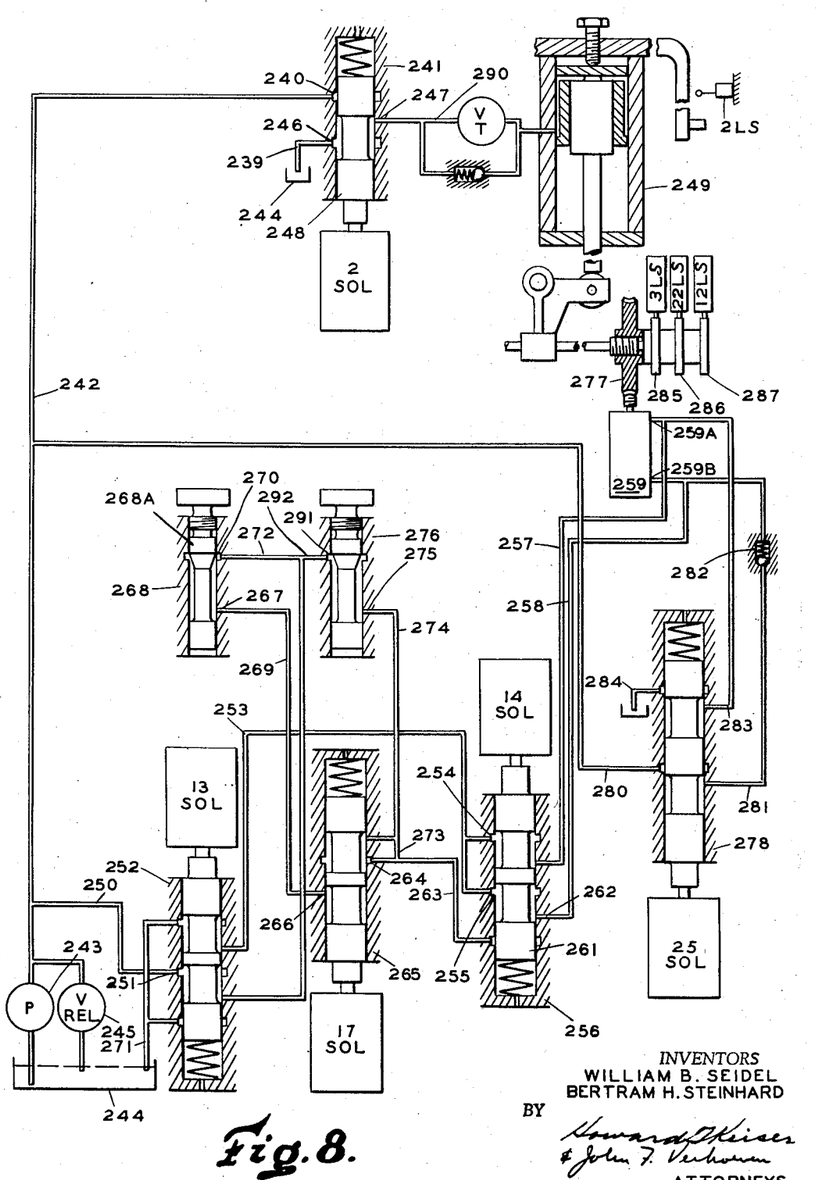
Fig. 8 is a partial schematic hydraulic diagram of the machine.

A portion of the hydraulic circuit of the machine is shown in Fig. 8. Pressure is supplied to pressure port 240 of valve 241 through conduit 242 from pump 243 connected to the reservoir 244. Valve 245 establishes the pressure in conduit 242. Valve 241 has exhaust port 246 and motor port 247. When solenoid 2SOL of valve 241 is energized to shift valve member 248 upwardly as viewed in Fig. 8, pressure port 240 is connected to motor port 247 and pressure is supplied through conduit 290 to hydraulic motor 249 which operates the same as the corresponding motor shown in Patent 2,795,088. This produces a rapid advance of the grinding wheel 17 toward the workpiece on the support 22. When solenoid 2SOL is deenergized and the valve is in the position shown, the motor 249 is connected to exhaust through conduit 290, port 247, valve 241, port 246, and conduit 239.

Pressure is also connected through conduit 250 to pressure port 251 of valve 252. When solenoid 13SOL of that valve is energized to shift the valve downwardly as viewed in Fig. 8, pressure is connected through the valve to conduit 253 and pressure ports 254 and 255 of valve 256. When solenoid 14SOL of valve 256 is deenergized and the valve is up as shown in Fig. 8, pressure is supplied through the valve to conduits 257 and 258, each of said conduits being connected to one of the ports 259A and 259B of motor 259, to lock the motor. When solenoid 14SOL is energized, and plunger 261 is shifted downwardly, port 254 is blocked and pressure is supplied only through port 255 and, through the valve, to conduit 257 and motor port 259A. The other port 259B of the motor 259 is connected by conduit 258 to port 262 and feed of the grinding wheel into the workpiece is initiated by rotation of the worm wheel 277. Port 262 is connected through the valve to conduit 263 and port 264 of valve 265. When solenoid 17SOL of valve 265 is energized and the valve is up, port 264 is connected through the valve to port 266 which, in turn, is connected to port 267 of the throttle valve 268 by conduit 269. Port 270, the size of which may be varied by rotation of valve member 268A, is connected to discharge conduit 271 through conduit 272 and valve 252 when solenoid 13SOL of that valve is energized.

Conduit 263 is connected by way of conduit 273 to conduit 274 connecting to port 275 of a second throttle valve 276 similar to valve 268. Flow occurs through the valve to port 291 and conduit 292 connecting to conduit 272. Thus, when the solenoid 17SOL of valve 265 is energized and the valve is up, discharge from port 259B of motor 259 will flow through both throttle valves 268 and 276. However, when solenoid 17SOL is deenergized, and the spring-urged valve member returns to the position shown in Fig. 8, flow to valve 268 is blocked and discharge is restricted to flow through the throttle valve 276, thus slowing the motor 259 and the feed of grinding wheel 17.

After solenoid 14SOL has been deenergized to block motor 259, reverse rotation of the motor is accomplished by the simultaneous reenergization of solenoid 14SOL and energization of solenoid 25SOL of valve 278. This unblocks the motor and shifts the plunger of valve 278 to connect conduit 280, which receives pressure from conduit 242, to the port 259B of the motor through conduit 281 and check valve 282. The other port 259A of the motor is connected to exhaust through conduit 283, valve 278 and conduit 284.

Figure 9:
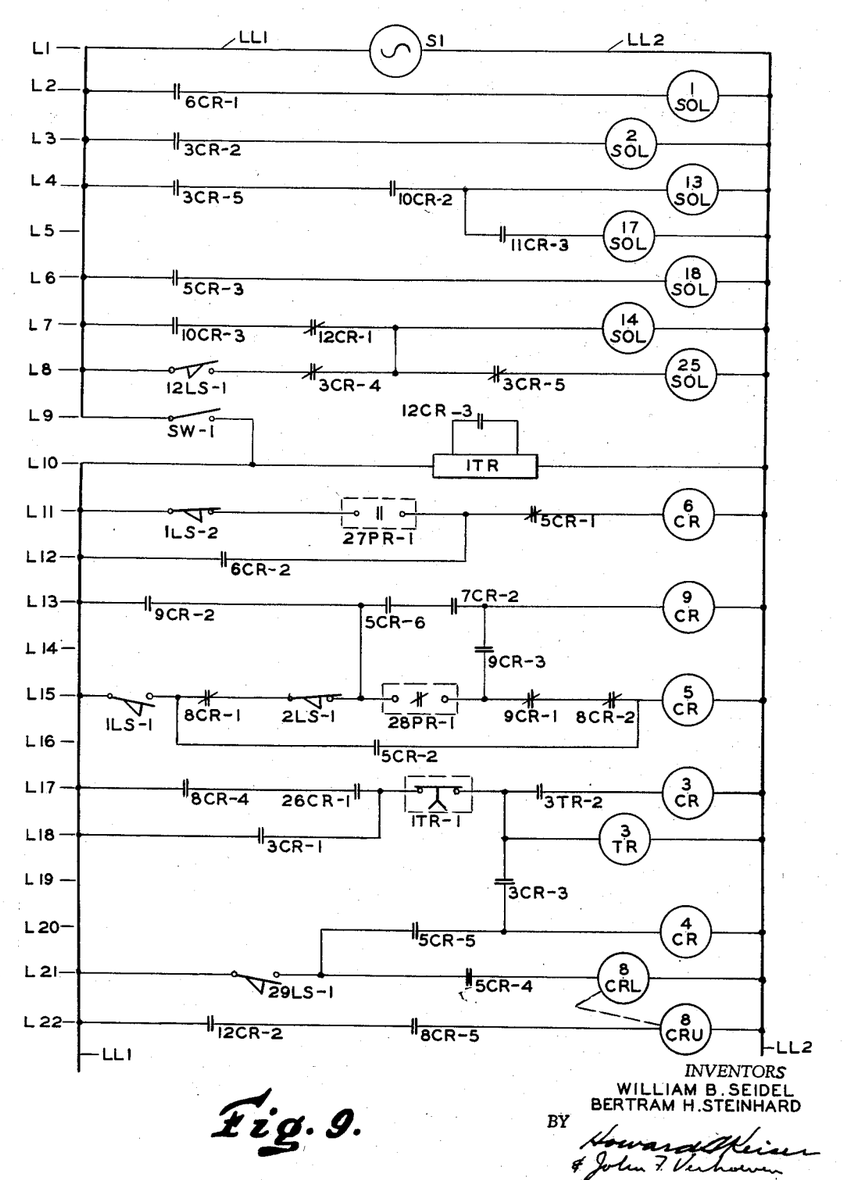
Figs. 9 and 10 show the electrical circuit for the work handling mechanism.
Figure 10:
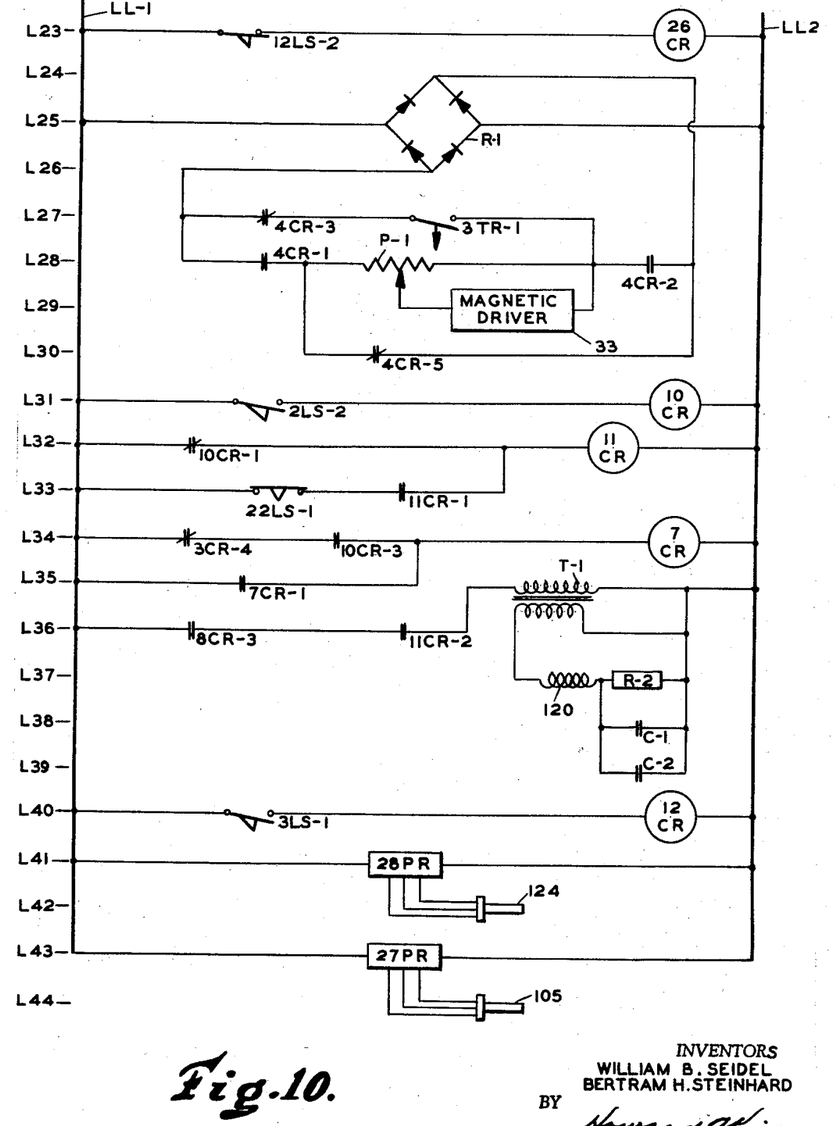

The electrical circuit for the mechanism of the present invention is shown in Figs. 9 and 10. The numbers in parentheses in the description which follows indicates the location of parts on the diagram and correspond to the numbers at the left margin thereof. Limit switch contacts are identified by weights thereon, contacts above the terminals being normally closed, and contacts below the terminals being normally open. Other contacts, which are numbered with a prefix corresponding to the relay by which they are operated, are normally closed if a diagonal line cuts through the contacts and are normally open if no such line is shown. Limit switches 3LS, 22LS, and 12LS are operated by cams 285, 286, and 287, respectively, carried on drum 288 connected to worm wheel 277 (see Fig. 8). The cams are angularly positioned to operate limit switch 12LS when the grinding wheel is fully retracted, to operate limit switch 22LS when the grinding wheel is in a position where it is desired to change from fast feed to slow feed, and to operate limit switch 3LS when the grinding wheel is in the position at which the workpiece is down to the desired size. The limit switch 2LS is operated by the grinding wheel housing at the end of the rapid advance of the grinding wheel in the same manner as limit switch 2LS in Patent 2,795,088.

Lines LL1 and LL2 are connected to source S1 (L1) and line LL1 has a switch SW1 (L9) which is closed for the automatic operation of the transfer mechanism. As the arms 64 and 65 swing back to their pickup position empty their shafts are retracted, or in their disengaged positions, having been shifted away from the plane of the chutes and the work support. Limit switch 1LS is therefore not operated. Relay 6CR (L11) is energized at this time and consequently solenoid 1SOL (L2) is energized through contact 6CR-1. As the arms reach their pickup position, the escapement is hydraulically operated to swing between the first and second workpieces on the delivery chute and the arms are hydraulically shifted toward the plane of the chutes to engage workpieces, operating limit switch 1LS when the fingers on the arms become fully engaged with the workpieces. At this time, on the first cycle, the grinding wheel is back so limit switch 2LS is not operated and the workpiece previously ground has left the discharge chute 36. Relay 5CR (L15) is therefore energized through normally closed contacts 8CR-1, 2LS-1, 28CR-1, 9CR-1 and 8CR-2, and normally open contact 1LS-1, being sealed in through contact 1LS-1 and normally open contact 5CR-2. This opens normally closed contact 5CR-1, dropping out relay 6CR (L11) and solenoid 1SOL (L2). When relay 5CR is energized, solenoid 18SOL (L6) is energized through contact 5CR-3, operating valve 191 to swing the arms toward their delivery position. Contact 28PR-1 is a contact of the proximity control unit 28PR (L41) which is connected across lines LL1 and LL2 and is operated in response to a workpiece rolling past the probe member 124 (L42) thereof. Proximity control unit 27PR (L43) and probe 105 (L44) operate in a similar manner. The control units may be similar to the control unit 4905RY, and the probe unit 4910WPL, of the Electro Products Corporation.

As the arms approach their delivery position, limit switch 29LS is operated by cam member 183 closing normally open contact 29LS-1 (L21). This energizes the pick up coil 8CRL of the mechanical latch relay 8CR through normally open contact 5CR-4 and energizes relay 4CR (L20) through normally open contact 5CR-5. Rectifier circuit R1 (L25) is connected across lines LL1 and LL2 and the magnetic driver 33 (L29) is energized through contacts 4CR-1, 4CR-2, and potentiometer P1. Relay 11CR (L32), which is energized through normally closed contact 10CR-1 and sealed in through normally closed contact 22LS-1 and normally open contact 11CR-1, is energized at this time, and therefore the A.C. demagnetizer 120 (L37) is energized through normally open contacts 8CR-3, 11CR-2, and transformer T1. The demagnetizer has connected in series therewith parallel connected resistor R2 and capacitors C1 and C2 so that when the circuit between lines LL1 and LL2 is broken, the current through the demagnetizer is not abruptly stopped, which might leave the unit magnetized, but instead, decays to zero magnitude to obviate the possibility of leaving significant residual magnetism in the unit.

Since the grinding wheel is retracted before limit switch 29LS is operated, relay 26CR (L23) is energized through normally open contact 12LS-2 and timer relay 3TR (L18) is energized through normally open contacts 8CR-4 and 26CR-1 and normally closed contact 1TR-1. This latter contact is a contact of electronic timer 1TR (L10). Timer relay 3TR has a normally open delay open contact 3TR-1 (L27), which closes at this time, and a normally open contact 3TR-2 which closes to energize relay 3CR (L17) through contacts 8CR-4, 26CR-1, 1TR-1 and 3TR-2. Contact 3CR-1 is connected across contacts 8CR-4 and 26CR-1. At this time, solenoid 2SOL (L3) is energized through normally open contact 3CR-2, and rapid advance of the grinding wheel is initiated.

When the arms 64 and 65 reach their delivery position, they are shifted hydraulically by operation of valve 163 out of engagement with workpieces carried thereon, and the escapement is operated to release a workpiece which may then drop down to the pickup position. It will be noted that at this time both the magnetic driver 33 (L29) and the demagnetizer 120 (L37) are energized so that the workpieces are securely held on the support shoes 30 and 31, and the discharge chute 36 as the arms are shifted away from the plane of the chutes and the workpiece support. This shifting of the arms releases limit switch 1LS, closing contacts 1LS-2 and opening contact 1LS-1. If a workpiece is on the loading chute and the contact 27PR-1 is closed by operation of unit 27PR in response to a workpiece adjacent the probe portion 105, relay 6CR (L11) is energized through contacts 1LS-2, 27PR-1, and normally closed contact 5CR-1 to energize solenoid 1SOL and start the arms back to their pickup position. Relay 6CR is sealed in through contact 6CR-2 connected across contacts 1LS-2 and 27PR-1. Relay 5CR (L15) is dropped out, opening its normally open contacts deenergizing 18SOL and coil 8CRL. Relay 4CR (L20) which was initially energized through contact 5CR-5, remains energized through contact 3CR-3 and the circuit comprising contact 1TR-1 and the parallel branches of the contacts 8CR-4 and 26CR-1, and 3CR-1.

When at the end of the rapid advance of the wheel by means of motor 249, the limit switch 2LS is operated, contact 2LS-2 is closed, energizing relay 10CR (L31). This closes contact 10CR-3 and, since at this time, normally closed contact 12CR-1 is closed, solenoid 14SOL (L7) is energized to unblock hydraulic motor 259. Simultaneously, solenoid 13SOL (L4) is energized through contact 10CR-2 and 3CR-5 to operate motor 259 and begin rotation of worm wheel 277, initiating the feed portion of the grinding wheel cycle. At the same time, solenoid 17SOL (L5) is energized through normally open contact 11CR–3, since at this time relay 11CR is energized. With solenoid 17SOL energized relatively fast feed occurs since discharge from motor 259 is through both throttle valves 268 and 276. Initiation of the feed portion of the grinding wheel cycle releases limit switch 12LS, dropping out relay 26CR (L23), and, after a time, limit switch 22LS is operated which opens normally closed contact 22LS–1 and releases relay 11CR (L32), deenergizing the demagnetizer 120. This releases the workpiece therefrom and permits it to roll out the discharge chute 36 past probe member 124 to open contact 28PR–1 of the probe unit 28PR. The release of relay 11CR deenergizes solenoid 17SOL (L5) and a relatively slow feed is begun, discharge from motor 259 occurring only through valve 276.

When the workpiece is ground to final size, limit switch 3LS is operated, energizing relay 12CR (L40) through normally open contact 3LS–1. This opens contact 12CR–1 to deenergize solenoid 14SOL (L7) and block motor 259. At the same time, normally open contact 12CR–2 is closed, and coil 8CRU (L22) of relay 8CR is energized to unlatch and drop out that relay. Contact 12CR–3, connected to electronic timer 1TR (L10), closes to begin the timing of contact 1TR–1, and, after a sufficient time has elapsed for spark out, contact 1TR–1 times open to deenergize relay 3CR (L17), deenergizing solenoid 2SOL (L3) to open hydraulic motor 249 to exhaust and begin retraction of the grinding wheel. At the same time solenoid 13SOL (L4) is deenergized. Retraction of the grinding wheel releases relay 12CR (L40) and, therefore, coil 8CRU (L22). When contact 1TR–1 opens and relay 3CR (L17) is released, relays 3TR (L18) and 4CR (L20) are deenergized. Release of relay 4CR reverses the connection of the magnetic driver 33 across the rectifier circuit 41, by opening of the contacts 4CR–1 and 4CR–2 and closing of the normally closed contacts 4CR–3 and 4CR–4 to remove any residual magnetism therefrom. At this time contact 3TR–1 is still closed, eventually timing open to break the reverse circuit established when relay 4CR became deenergized.

When relay 3CR is deenergized, solenoid 14SOL (L7) is energized through normally closed contacts 12LS–1 and 3CR–4, to unblock motor 259. Solenoid 25SOL (L8) is energized through the same contacts and 3CR–5 to shift valve 278 and effect rapid reversal of motor 259 and worm wheel 277. Solenoids 14SOL (L7) and 25SOL (L8) are deenergized when normally closed contact 12LS–1 is opened as the wheel reaches its retracted position, and relay 10CR (L31) is deenergized when limit switch 2LS is released on retraction of the wheelhead.

While the workpiece is being ground, the arms 64 and 65 are returning to their pickup position, and limit switch 29LS is released. When the arms reach their pickup position, they are shifted hydraulically toward the plane of the chutes and the workpiece support to engage workpieces, and limit switch 1LS is operated, closing normally open contacs 1LS–1 and opening normally closed contact 1LS–2. Relay 5CR (L15) is then energized again when limit switch 2LS is released on retraction of the wheelhead, providing the previous operated workpiece has left the discharge chute, and the arms swing to their delivery position.

On the first cycle of operation, relay 7CR (L34) is energized through normally closed contact 3CR–4 and normally open contact 10CR–3 when relay 3CR (L17) drops out after the spark out. Relay 7CR is held sealed in on subsequent cycles by the normally open contact 7CR–1. On the first cycle relay 9CR (L13) is not energized since normally open contact 5CR–6 opens before normally open contact 7CR–2 closes and normally open contacts 9CR–2 and 9CR–3 remain open until relay 9CR is energized. Thus, normally closed contact 9CR–1 remains closed during the first cycle, and when the arms become engaged with the workpieces at the pickup position and the wheelhead retracts, relay 5CR is energized to swing the arms toward the delivery position. However, with contact 7CR–2 closed on subsequent cycles, relay 9CR is energized each cycle, initially through contact 1LS–1, 8CR–1, 2LS–1, 5CR–6, and 7CR–2 when relay 5CR is energized. This opens contact 9CR–1, relay 5CR being sealed in around that contact by contact 5CR–2. When relay 5CR is subsequently deenergized, relay 9CR stays energized through contact 9CR–2, 28PR–1, and 9CR–3. When a workpiece rolls out discharge chute 36, contact 28PR–1 opens and relay 9CR becomes deenergized, thus closing normally closed contact 9CR–1 so that on the next cycle relay 5CR may be energized through this contact. If the workpiece gets caught in the discharge chute so that contact 28PR–1 will not be opened, relay 9CR will remain energized, and relay 5CR will not be picked up so that the arms will not swing to their delivery position. Also if contact 28PR–1 is opened by the presence of a workpiece which, however, gets caught and holds 28PR–1 open relay 5CR can not be picked up.

In operation a plurality of unoperated workpieces are received on the delivery chute 35 comprising storage means, the first workpiece rolling against the stop 69 when the escapement mechanism is rotated clockwise from the position shown in Fig. 1. As the arms 64 and 65, swinging empty, reach their pickup positions shown in Fig. 1 the escapement mechanism rotates to the position shown in Fig. 1 and the arms are shifted toward the workpieces, the finger on loading arm 64 being received in the lower unoperated workpiece on chute 35 and the finger on unloading arm 65 being received in the workpiece, on the workpiece support shoes 30 and 31. When the wheelhead 16 has retracted to release limit switch 2LS, the arms are swung simultaneously toward their delivery position, the finger of arm 64 following path 67 and the finger of arm 65 following path 68. The workpieces are confined on the finger by the wear plate on one side and the shoulder on the finger on the other side. As the arms approach their delivery position, say within 10 degrees thereof, limit switch 29LS is operated by a cam on one of the shafts which rotate the arms. This energizes the magnetic driver 33 and the demagnetizer 120 and initiates movement of the grinding wheel 17 toward the workpiece support 22. Immediately thereafter the arms reach their delivery position, the workpiece on arm 64 being deposited on shoes 30 and 31 and the workpiece on arm 65 being deposited on discharge chute 36. The arms are simultaneously shifted away from the workpieces, which are held in position by the magnetic driver and demagnetizer, respectively, and the arms return empty to their pickup positions while the workpiece on shoes 30 and 31 is being ground. When the arms reach their pickup positions they again shift into engagement with workpieces. The finger on arm 65 is sufficiently smaller than the inner diameter of the workpiece on the shoes 30 and 31 so that it may be inserted into the workpiece even as the workpiece is being ground. When the wheelhead retracts, after completion of the grinding, the arms once again move to their delivery positions.

While the parts loaded and unloaded by the mechanism of the present invention in the above description have been workpieces, it will be understood that the mechanism may be utilized for loading and unloading other parts, such as expendable tools, in a machine tool.

What is claimed is:

1. A transfer mechanism for a machine tool having means to support a workpiece for an operation thereon comprising means to hold unoperated workpieces, means to receive operated workpieces, a pair of workpiece carriers, one of said carriers being movable between a pickup position at the unoperated workpiece holding means and a delivery position at the workpiece supporting means and the other of said carriers being movable between a pickup position at the workpiece supporting means and a delivery position at the operated workpiece receiving means, means to move said carriers in unison between their pickup and delivery positions, and means to effect engagement of workpieces with said carriers at their pickup positions and disengagement of said workpieces from said carriers at their delivery positions.

2. A transfer mechanism for a machine tool having means to support a workpiece for an operation thereon comprising means to hold unoperated workpieces, means to receive operated workpieces, a pair of workpiece carriers, one of said carriers being movable in a path from a pickup position at the unoperated workpiece holding means to a delivery position at the workpiece supporting means and the other of said carriers being movable in a path from a pickup position at the workpiece supporting means to a delivery position at the operated workpiece receiving means, said carriers being shiftable in relation to said paths at their pickup and delivery positions, means to shift said carriers toward said paths for engagement with workpieces at their pickup positions, means to move said carriers in unison in their respective paths from their pickup positions to their delivery positions, and means to shift said carriers away from said paths at their delivery positions for disengagement from said workpieces.

3. A transfer mechanism for a machine tool having means to support a workpiece for an operation thereon comprising a first chute to hold unoperated workpieces, a second chute to receive operated workpieces, a pair of arms each pivoted about one end and having means at the opposite end to engage a workpiece, one of said arms being swingable in a plane from a pickup position where said opposite end is adjacent the first chute to a delivery position where said opposite end is adjacent the workpiece supporting means and the other of said arms being swingable in a plane from a pickup position where said opposite end is adjacent the workpiece supporting means to a delivery position where said opposite end is adjacent the second chute, said arms being shiftable in relation to their planes at their pickup and delivery positions, means to shift said arms in unison toward said planes for engagement with workpieces at their pickup positions, means to swing said arms in their planes in unison from their pickup positions to their delivery positions, means to shift said arms in unison out of their planes at their delivery positions for disengagement from said workpieces, and means to return said arms in unison to their pickup positions.

4. A transfer mechanism for a machine tool having means to support a workpiece for an operation thereon comprising a first chute to hold unoperated workpieces, a second chute to receive operated workpieces, the chutes and the workpiece supporting means lying in a common plane, a fixed support, a pair of spaced shafts rotatably carried by said support and axially shiftable in relation thereto, a pair of arms secured at one end respectively to said shafts and each having means at the opposite end to engage a workpiece, one of said arms being swingable from a pickup position where said opposite end is adjacent the first chute to a delivery position where said opposite end is adjacent the workpiece supporting means and the other of said arms being swingable from a pickup position where said opposite end is adjacent the workpiece supporting means to a delivery position where said opposite end is adjacent the second chute, means to shift said arms in unison toward said common plane when the arms are at their pickup position to engage workpieces, means to swing said arms in unison from their pickup positions to their delivery positions, means to shift said arms in unison away from said common plane when the arms are at their delivery position to disengage the workpieces, and means to swing said arms to their pickup positions.

5. A transfer mechanism for a machine tool having means to support a workpiece for an operation thereon comprising a first chute to hold unoperated workpieces, a second chute to receive operated wokpieces, a fixed support, a pair of sleeves rotatably carried by said support and having gears secured thereon, a pair of shafts nonrotatably received in said sleeves and axially shiftable in relation thereto, a pair of arms having one end secured to said shafts and having means at the opposite end to engage a workpiece, a hydraulic motor operatively connected to said gears to rotate the same and swing said arms simultaneously, said opposite end of one of the arms being swung from a position adjacent the first chute to a position adjacent the workpiece supporting means and said opposite end of the other arm being swung from a position adjacent the workpiece supporting means to a position adjacent the second chute, and a second hydraulic motor operatively connected to said shafts to shift the same axially in unison when the shafts are in said positions for engagement with and disengagement from workpieces.

6. A transfer mechanism for a machine tool having means to support a workpiece for an operation thereon and magnetic means operable when energized to attract and hold the workpiece on said supporting means during the operation, the transfer mechanism comprising a first chute to hold unoperated workpieces, a second chute to receive operated workpieces and having magnetic means operable when energized to attract and hold a workpiece therein for demagnetization of the same, a pair of workpiece carriers having means to engage a workpiece, means to move one of said carriers from a pickup position at the first chute to a delivery position at the workpiece supporting means and simultaneously to move the other of said carriers from a pickup position at the workpiece supporting means to a delivery position at the second chute, means to shift said carriers simultaneously at their pickup positions to engage a workpiece and at their delivery positions to disengage a workpiece, and means coordinated with the movement of said carriers to hold both the magnetic means energized when said carriers are shifted at their delivery positions for disengagement from the workpieces.

7. In a machine tool having a grinding wheel, a support for workpieces adjacent the grinding wheel, and a magnetic driver adjacent the support operable when energized to hold a workpiece on said support, a first chute adapted to hold an unoperated workpiece in the plane of the support, a second chute adapted to receive an operated workpiece in said plane, the second chute having a demagnetizer operable when energized to hold a workpiece therein, a housing, a pair of axially shiftable parallel shafts rotatably carried by said housing and extending therefrom normal to said plane, a pair of arms received on said shafts and swingable parallel to said plane, each of said arms having a finger at its outer end adapted to engage a workpiece, one of said arms being swingable between a pickup position adjacent the first chute and a delivery position adjacent the workpiece support and the other of said arms being swingable between a pickup position adjacent the workpiece support and a delivery position adjacent the second chute, hydraulically powered means to rotate said shafts and swing said arms in unison between their pickup and delivery positions, hydraulically powered means to shift said shafts axially relative to said plane, control means operable to actuate said shifting means when the arms are at their pickup position to move said arms toward said plane for engagement of the fingers thereof with workpieces, said control means operable oppositely to shift said arms at their delivery position for disengagement of the fingers thereof from the workpieces, and control means to hold the magnetic driver and the demagnetizer energized when the shafts are oppositely shifted away from said plane.

8. A machine tool having a support for workpieces, a grinding wheel movable towards and away from the support to perform a grinding operation on a workpiece thereon, a magnetic driver adjacent the support operable when energized to hold a workpiece on said support, a first chute to hold an unoperated workpiece, a second chute to receive operated workpieces, the second chute having a demagnetizer operable when energized to hold a workpiece therein, a pair of pivoted arms having fingers at their outer ends, one of said arms being swingable from a pickup position where its finger is in registration with a workpiece in the first chute to a delivery position at the workpiece support in registration with the magnetic driver and the other of said arms being swingable from a pickup position where its finger is in registration with a workpiece on the support to a delivery position in registration with the demagnetizer at the second support, said arms being shiftable normal to the direction of their swinging movement, means responsive to the angular position of said arms to shift the arms in unison and engage the fingers thereof with workpieces at their pickup positions, means responsive to said shifting to swing the arms in unison to their delivery positions, means responsive to the angular position of the arms to initiate movement of the grinding wheel towards the support, means responsive to the angular position of the arms to energize the magnetic driver and the demagnetizer, means responsive to the angular position of the arms at the delivery position to shift the arms in unison and disengage the fingers thereof from workpieces, and means responsive to the shifting of the arms out of engagement with the workpieces to return the arms to their pickup position.

9. In a machine tool, a workpiece support, a rotating grinding wheel movable in a predetermined cycle towards and away from said support when actuated, a magnetic driver adjacent the support operable when energized to hold a workpiece on said support, a first chute to hold an unoperated workpiece, a second chute to receive operated workpieces, said chutes and the workpiece support lying in a common plane, the second chute having a demagnetizer operable when energized to hold a workpiece therein, a pair of arms having fingers at one end and pivoted at the opposite end to swing parallel to said plane, said arms being shiftable in a direction normal to said plane, the finger of one arm being swingable between a pickup position adjacent the first chute and a delivery position adjacent the workpiece support and the finger of the other arm being swingable between a pickup position adjacent the workpiece support and a delivery position adjacent the second chute, a hydraulic motor operatively connected to said arms to swing the same in unison, a second hydraulic motor operatively connected to said arms to shift the same in unison, valve means associated with each of said hydraulic motors, means responsive to the arrival of the fingers at the pickup positions to operate the valve means associated with said second hydraulic motor and shaft the arms to engage the fingers thereof with workpieces, means responsive to retraction of the grinding wheel to operate the valve means associated with said first hydraulic motor and swing the arms to their delivery positions, switch means operable at a predetermined angular position of the arms as they approach their delivery positions, means responsive to the operation of said switch means to energize the magnetic driver and the demagnetizer and actuate the grinding wheel to initiate movement toward the support, means responsive to the arrival of the fingers at the delivery position to operate the valve means associated with said second hydraulic motor to shift the arms and disengage the fingers thereof from the workpieces, and means responsive to said disengagement to operate the valve means associated with the first hydraulic motor to swing the arms to their pickup position.

10. In a machine tool, a workpiece support, a rotating grinding wheel movable in a predetermined cycle towards and away from said support when actuated, a magnetic driver adjacent the support operable when energized to hold a workpiece on said support, a first chute to hold unoperated workpieces, the first chute having an escapement mechanism associated therewith to release a workpiece therefrom, a second chute to receive operated workpieces and discharge the same, the second chute having a demagnetizer associated therewith operable when energized to hold a workpiece therein, said chutes and the workpiece support lying in a common plane, a housing, a pair of shafts rotatably carried by the housing and extending normal to said common plane, said shafts being axially shiftable towards and away from said plane, a pair of arms connected, respectively, at one end to said shafts and having fingers at their opposite ends loosely receiveable in workpieces, the finger of one arm being swingable between a pickup position adjacent the first chute and a delivery position adjacent the workpiece support and the finger of the other arm being swingable between a pickup position adjacent the workpiece support and a delivery position adjacent the second chute, a hydraulic motor operatively connected to said shafts to rotate the same in unison, a second hydraulic motor operatively connected to said shafts to shift the same axially in unison, valve means associated with each of said hydraulic motors, means responsive to the arrival of the fingers at the pickup positions to operate the valve means associated with said second hydraulic motor and shift the arms to insert the fingers thereof into workpieces, means responsive to retraction of the grinding wheel to operate the valve means associated with said first hydraulic motor and swing the arms to their delivery positions, switch means operable at a predetermined angular position of the arms as they approach their delivery positions, means responsive to the operation of said switch means to energize the magnetic driver and the demagnetizer and actuate the grinding wheel to initiate movement thereof toward the support, means responsive to the arrival of the fingers at the delivery position to operate the valve means associated with said second hydraulic motor to shift the arms and remove the fingers thereof from the workpieces, means responsive to said removal to operate the valve means associated with the first hydraulic motor to swing the arms to their pickup position, hydraulic means to operate the escapement in coordination with the movement of the arms, and means operable in response to failure of the second chute to discharge a workpiece to disable the arms.

11. In a machine tool, means to support a workpiece for an operation thereon, a delivery chute to hold unoperated workpieces, a discharge chute to receive operated workpieces, a pair of workpiece carriers, one of said carriers being movable between a pickup position at the delivery chute and a delivery position at the workpiece supporting means and the other of said carriers being movable between a pickup position at the workpiece supporting means and a delivery position at the discharge chute, magnetic means associated with the workpiece supporting means and the discharge chute, means to move said carriers in unison between their pickup and delivery positions, means operatively connected to said carriers to effect engagement of workpieces with the carriers at their pickup positions and disengagement of said workpieces from the carriers at their delivery positions, and means coordinated with the movement of the carriers to energize said magnetic means and hold the delivered workpieces during disengagement of the carriers therefrom.

12. In a machine tool, means to support a workpiece for an operation thereon, a delivery chute to hold unoperated workpieces, a discharge chute to receive operated workpieces, a pair of workpiece carriers each having means thereon to support a workpiece, one of said carriers being movable between a pickup position at the delivery chute and a delivery position at the workpiece supporting means and the other of said carriers being movable between a pickup position at the workpiece supporting means and a delivery position at the discharge chute, said carriers being shiftable at their pickup and delivery positions to engage and disengage workpieces, magnetic means associated with the workpiece supporting means and the discharge chute, means to shift said carriers into engagement with workpieces at their pickup positions, means to move said carriers in unison from their pickup positions to their delivery positions, means coordinated with the movement of the carriers to energize said magnetic means to hold the delivered workpieces, means to shift said carriers at their delivery positions out of engagement with workpieces thereon, and means to move said carriers to their pickup positions.

13. A loader for a machine tool having means to support a workpiece for an operation thereon comprising means to hold unoperated workpieces, means to receive operated workpieces, a pair of workpiece carriers, one of said carriers being movable between a pickup position at the unoperated workpiece holding means and a delivery position at the workpiece supporting means and the other of said carriers being movable between a pickup position at the workpiece supporting means and a delivery position at the operated workpiece receiving means, a source of power, and motion transmitting means connecting said carriers to the source of power, said motion transmitting means including a swingable arm engaged with a cross-slide to swing the arms and decelerate the same as they approach their delivery positions.

14. A loader mechanism for a machine tool having means to support a workpiece for an operation thereon comprising means to hold unoperated workpieces, means to receive operated workpieces, a pair of arms each pivoted about one end and having means at the opposite end to engage a workpiece, one of said arms being swingable in a plane from a pickup position where said opposite end is adjacent the unoperated workpiece holding means to a delivery position where said opposite end is adjacent the workpiece supporting means and the other of said arms being swingable in a plane from a pickup position where said opposite end is adjacent the workpiece supporting means to a delivery position where said opposite end is adjacent the operated workpiece receiving means, a hydraulic motor, a rack having a cross slide, a crank operatively connected to the hydraulic motor and engaged with the cross slide to reciprocate the rack, and means operatively connecting the arms to the rack to swing the same between their pickup and delivery positions whereby the arms are decelerated as they approach their delivery positions.

15. A loader mechanism for a machine tool having means to support a workpiece for an operation thereon comprising a first chute to hold unoperated workpieces, a second chute to receive operated workpieces, a fixed support, a pair of spaced shafts rotatably carried by said support and axially shiftable in relation thereto, a pair of arms secured at one end respectively to said shafts and each having means at the opposite end to engage a workpiece, one of said arms being swingable in a plane from a pickup position where said opposite end is adjacent the first chute to a delivery position where said opposite end is adjacent the workpiece supporting means and the other of said arms being swingable in a plane from a pickup position where said opposite end is adjacent the workpiece supporting means to a delivery position where said opposite end is adjacent the second chute, a hydraulic cylinder having a rack piston, a rack member having a cross slide, a shaft operatively connected to said rack piston for rotation thereby, an arm carried by said shaft having means to engage said cross slide, means operatively connecting said rack member to said pair of shafts for rotation thereof, means to reciprocate said rack piston to swing said pair of arms in unison between their pickup and delivery positions, means to shift said pair of spaced shafts in unison toward said planes when the arms are in their pickup position for engagement of workpieces, and means to shift said shafts away from their planes when the arms are at their delivery positions for disengagement from workpieces.

16. A loader for a machine tool having means to receive and hold a part, the loader comprising storage means for a plurality of said parts, a pair of arms each pivoted about one end and having means at the opposite end to engage a part, one of said arms being swingable in a plane from a pickup position where said opposite end is adjacent said storage means to a delivery position where said opposite end is adjacent the part holding means on the machine tool and the other of said arms being swingable in a plane from a pickup position where said opposite end is adjacent the part holding means on the machine tool to a delivery position where said part is released, means to swing said arms in unison between their pickup and delivery positions, and means to effect engagement of parts at the pickup positions with said part engaging means and to effect disengagement of said parts at the delivery positions from said part engaging means.

17. A loader mechanism for a machine tool having means to receive and hold a part, the loader comprising storage means for a plurality of said parts, a fixed support, a pair of spaced shafts rotatably carried by said support and axially shiftable in relation thereto, a pair of arms secured at one end respectfully to said shafts and each having means at the opposite end to engage a part, one of said arms being swingable in a plane from a pickup position where said opposite end is adjacent the storage means to a first delivery position where said opposite end is adjacent the receiving and holding means on the machine tool and the other of said arms being swingable in a plane from a pickup position where said opposite end is adjacent the machine tool receiving and holding means to a second delivery position, means at the second delivery position to hold the part momentarily, a hydraulic motor, motion transmitting means operatively connecting the hydraulic motor to the shafts to rotate the same in unison between their pickup positions and delivery positions, said motion transmitting means including a member having a cross slide operatively connected to the shafts and a crank operatively connected to the hydraulic motor and engaged in said cross slide, and means to shift the shafts axially when the arms are at their pickup and delivery positions for engagement with and disengagement from parts.

18. A loader mechanism for a machine tool having means to support a workpiece for an operation thereon comprising wear plates supported to define a flat vertical surface extending toward the workpiece supporting means, a first chute to hold unoperated workpieces mounted against said surface, a second chute to receive operated workpieces mounted against said surface spaced from said first chute, a fixed support spaced from said surface and positioned between the chutes and the workpiece supporting means, a pair of spaced parallel axially shiftable shafts rotatably carried by said support and extending normal to said surface, a pair of arms secured at one end respectively to said shafts at different distances from said surface and each having means at the opposite end to engage a workpiece, one of said arms being swingable from a pickup position where said opposite end is adjacent the first chute to a delivery position where said opposite end is adjacent the workpiece supporting means and the other of said arms being swingable from a pickup position where said opposite end is adjacent the workpiece supporting means to a delivery position where said opposite end is adjacent the second chute, means to shift said shafts in unison toward the surface when the arms are at their pickup positions for engagement of workpieces, means to rotate said shafts in unison to swing the arms from their pickup positions to their delivery positions, means to shift said shafts away from said surface when the arms are at their delivery positions for disengagement from the workpiece, and means to rotate said shafts in the opposite direction to return said arms to their pickup positions.

References Cited in the file of this patent

UNITED STATES PATENTS

| | | |
|---|---|---|
| 2,546,752 | Johnson | Mar. 27, 1951 |
| 2,809,471 | Jones et al. | Oct. 15, 1957 |
| 2,828,588 | Durland | Apr. 1, 1958 |
| 2,874,518 | Balsiger | Feb. 24, 1959 |